United States Patent [19]
Beecham

[11] 3,896,417
[45] July 22, 1975

[54] BUFFER STORE USING SHIFT REGISTERS AND ULTRASONIC DELAY LINES

[75] Inventor: David Beecham, Allentown, Pa.

[73] Assignee: Bell Telephone Laboratories, Incorporated, Murray Hill, N.J.

[22] Filed: Nov. 30, 1973

[21] Appl. No.: 420,374

[52] U.S. Cl. .......................... 340/172.5; 340/173 RC
[51] Int. Cl.²...G11C 7/00; G11C 9/00; G11C 21/00; G11C 11/23
[58] Field of Search..... 340/172.5, 173 RC, 173 MS

[56] References Cited

UNITED STATES PATENTS

| | | | |
|---|---|---|---|
| 3,275,993 | 9/1966 | Bartlett | 340/173 RC |
| 3,340,514 | 9/1967 | Swift | 340/172.5 |
| 3,411,142 | 12/1968 | Lee | 340/172.5 |
| 3,501,746 | 3/1970 | Vosbury | 340/172.5 |
| 3,701,988 | 10/1972 | Allaart | 340/172.5 |
| 3,750,104 | 7/1973 | Chang | 340/172.5 |
| 3,755,788 | 8/1973 | Finch | 340/172.5 |

*Primary Examiner*—Gareth D. Shaw
*Assistant Examiner*—James D. Thomas
*Attorney, Agent, or Firm*—Richard B. Havill

[57] ABSTRACT

A plurality of shift registers is arranged in combination with a plurality of ultrasonic delay line modules for efficiently and synchronously storing an asynchronous stream of input data in the delay line modules. Control circuits are interposed for coordinating flow of the data into the registers, between the registers and the delay line modules, and out of the delay line modules.

8 Claims, 8 Drawing Figures

BUFFER STORE USING SHIFT REGISTERS AND ULTRASONIC DELAY LINES

BACKGROUND OF THE INVENTION

The invention is a buffer store that is more particularly described as a buffer store including a plurality of ultrasonic delay line time compressor (DELTIC) memory modules for storing an asynchronous stream of data signals.

Time is an important parameter used for distinguishing bits of a serial stream of data represented by electrical signals in a channel. The bits are separated from one another in time for purposes of identity.

One method of separating a serial stream of data signals in time involves operating a system synchronously and keeping bits in fixed time slots. All circuits of such a system must be operated at regular fixed times in response to cyclical clock pulses.

A serial stream of data signals also can be processed in a system operating asynchronously, or irregularly, without fixed time slots. A timing pulse is transmitted concurrently with each information bit and over a channel which is parallel to the channel transmitting the information. Such a timing pulse indicates when a bit is present in the information channel.

Ultrasonic delay line memories are known in the prior art. For example, see the *Digest of Technical Papers of the International Solid State Circuit Conference* (ISSCC) (1968), pages 108 and 109. In such memories, data bits are continuously recirculated in a serial stream at high speed in the form of signals representing 1's and 0's. The data stream flows past any selected point in the recirculation path at a regular, or synchronous, rate. The speed is determined by the rate of propagation of mechanical stress wave signals in a bar of selected material serving as the delay line. The rate of propagation may be in a range such that the delay line operates at a rate of approximately 50 megabits per second. Retiming and access circuits control insertion of data into, recirculation of data through, and retrieval of data from the delay line.

Delay line time compressor (DELTIC) memories are one form of recirculating memories that also are known in the prior art. See, for instance, the 1967 *IEEE International Convention Record*, Vol. 15, Part 11, pages 94 through 98. DELTIC memories provide good operating characteristics at a low cost. One advantage of these memories is that they are useful for speeding up the processing of low speed, input data.

In a DELTIC memory, data bits are inserted into the delay line by interleaving bits of the incoming stream of data at positions separated from one another in the delay line by a selected DELTIC interval. Such an interval is defined by a predetermined number of time slots which are left vacant between the storage positions of the first and second bits, also between the storage positons of the second and third bits, etc. While such initial bits of the incoming stream of data signals thereafter are being recirculated in the delay line, vacant storage positions, or time slots located between the initial bits, are filled with later arriving bits of the stream.

Ultrasonic delay line and solid state technologies have advanced sufficiently that ultrasonic DELTIC memories are becoming attractive as low cost, high speed digital memories.

One gap in the memory art creates a need for a low cost buffer store wherein an asynchronous stream of input data signals is time buffered to smooth irregular flow of the data prior to forwarding the data to other circuitry at high speed. One possible candidate for use in such a low cost buffer store is an ultrasonic DELTIC memory. However, when an asynchronous stream of input data signals is to be stored in a synchronously operating DELTIC memory, loading and unloading the memory efficiently presents a difficult problem.

SUMMARY OF THE INVENTION

Therefore, it is an object of the invention to develop an improved buffer store.

It is another object to develop an arrangement for efficiently storing asynchronous input data in a low cost, high speed DELTIC memory.

These and other objects of the invention are realized in a combination of a plurality of shift registers arranged to receive an asynchronous stream of input data signals and a plurality of recirculating ultrasonic delay line modules arranged to receive the stream of data synchronously from the shift registers in a time compression mode. Means are included for rapidly retrieving data from the delay line modules. Timing and control circuitry are interconnected with the combination to determine at any time which shift register receives incoming data, which shift register transfers data to a delay line module, which delay line module receives the transferred data, and the delay line module from which data is retrieved.

It is a feature of the invention to arrange a plurality of shift registers and recirculating delay line modules in combination with control circuitry for efficiently storing an asynchronous stream of input data signals in the delay lines.

It is another feature to provide an input write selector for directing received input data signals and input information timing pulses to a selected one of the shift registers for storing the asynchronously received input data in a selected shift register.

It is a further feature to provide an input read selector operating in concert with the input write selector for applying shift register read-drive pulses to a second selected one of the shift registers for transferring signals from the second selected shift register to a selected one of the delay line modules.

It is a still further feature to transfer adjacent bits of the input data stream from the second selected shift register into the selected one of the delay line modules at positions separated by a DELTIC interval (an integral number of storage positions), the interval and the total number of storage positions in the delay line module having the integer 1 as their only common denominator.

Additionally, it is a feature to retrieve the data in its initial sequential order from the delay line modules.

BRIEF DESCRIPTION OF THE DRAWING

These and other features of the invention may be better understood by reference to the detailed description following when that description is considered with respect to the attached drawings wherein.

DETAILED DESCRIPTION

Figure 1:
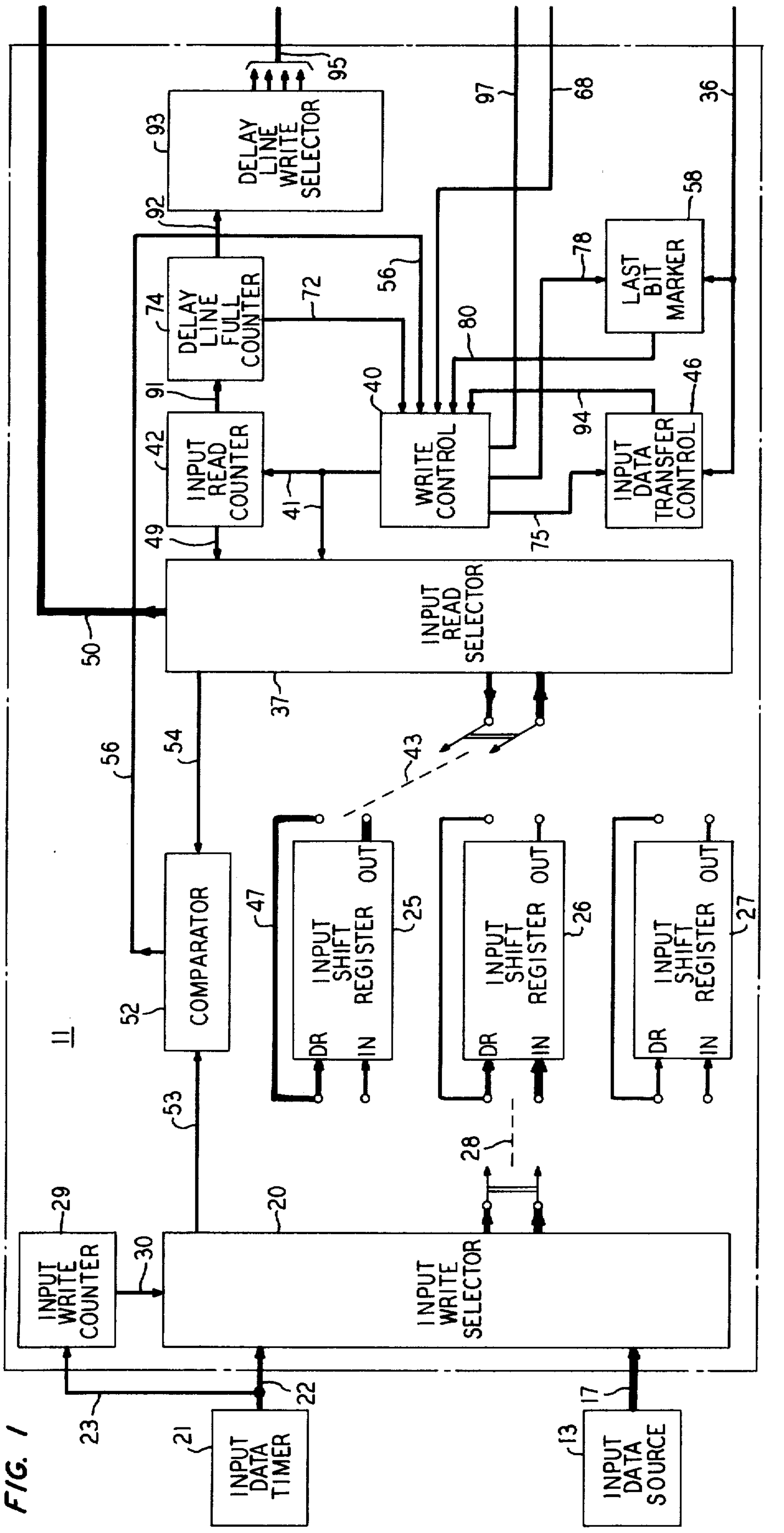
FIGS. 1, 2 and 3, when positioned as shown in FIG. 4, show a block diagram of a circuit arranged in accordance with the invention.
Figure 4:
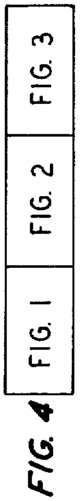
Figure 2:
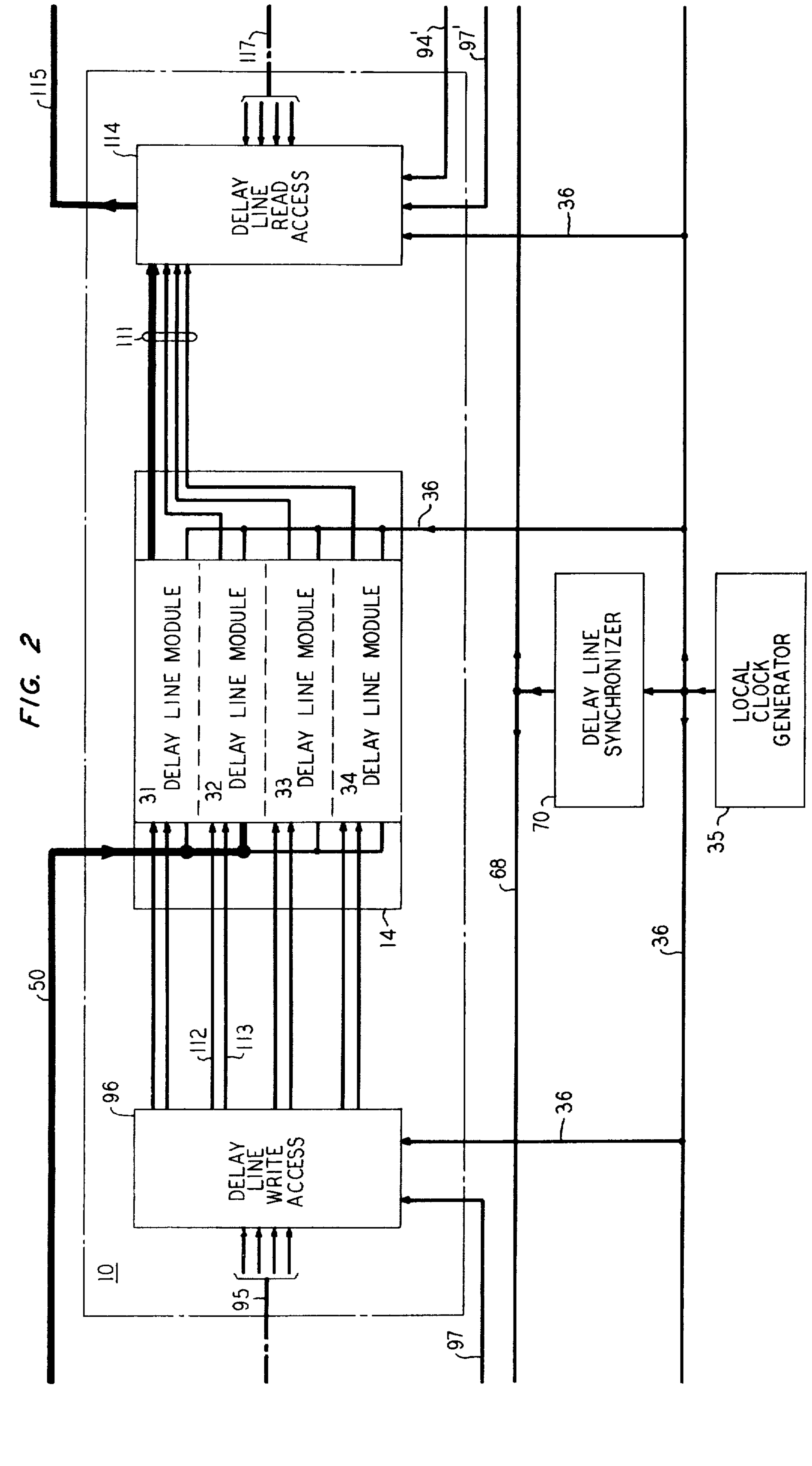
Figure 3:
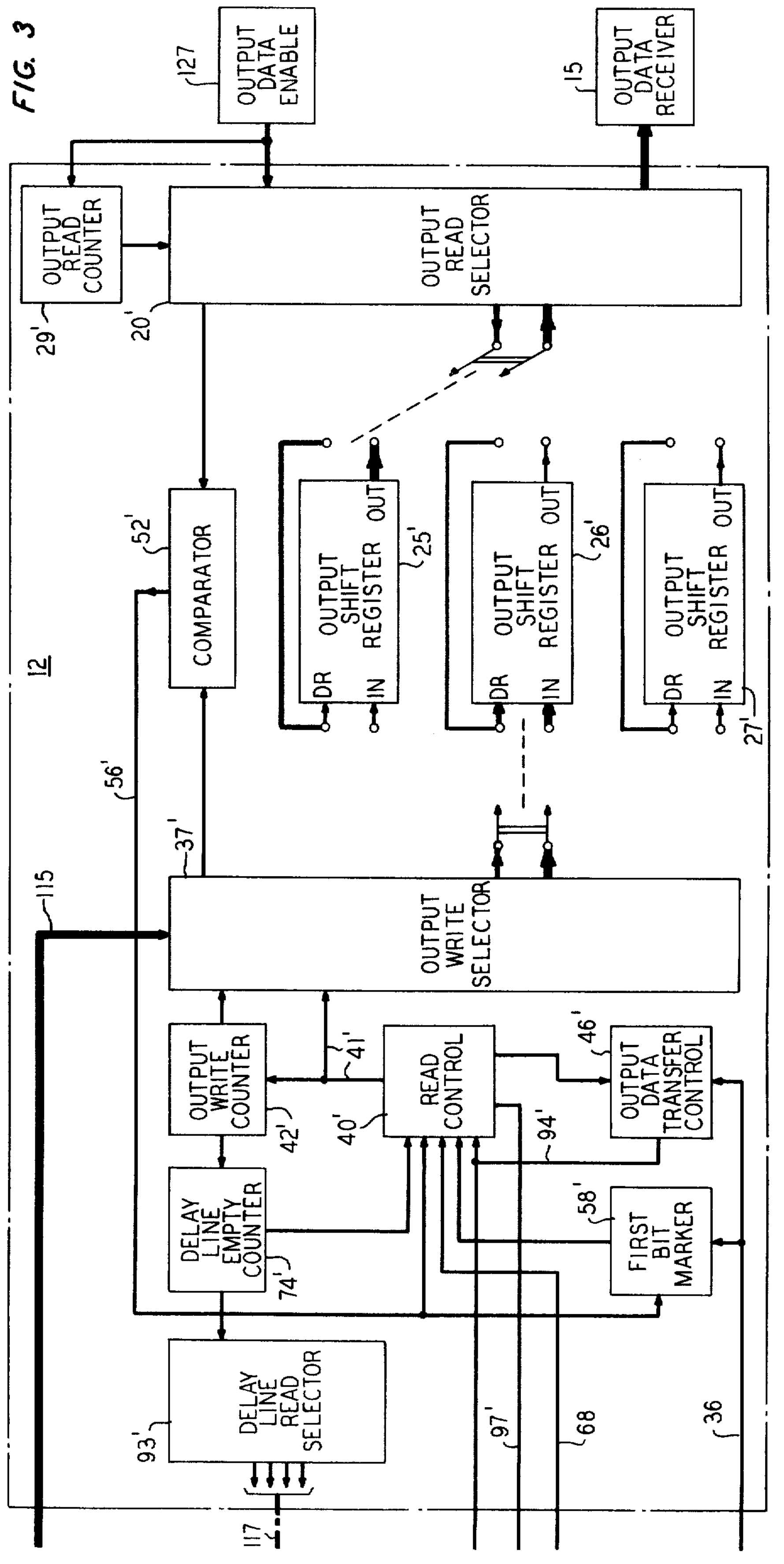

There is shown, in the block diagram of FIGS. 1, 2 and 3, a buffer store including a plurality of synchronously recirculating ultrasonic delay line modules and access circuits 10 arranged in combination with input circuitry 11 and output circuitry 12. An asynchronous sequential stream of data signals is received from an input data source 13. The bits thereof are time buffered by the input circuitry and are synchronously stored in a plurality of delay line modules 14. Thereafter in response to irregular demand signals, the output circuitry 12 retrieves from the delay line modules 14 the stored stream of data signals in its initial sequential order and forwards that data stream to an output data receiver 15.

Referring now to FIG. 1, there is shown an arrangement of circuitry which receives data signals asynchronously from the input data source 13 and time buffers those signals so that the signals can be stored efficiently in the synchronously operating delay line modules 14 of FIG. 2.

The asynchronous stream of input data signals is applied by way of led 17 to an input write selector 20. Bits of the stream arrive irregularly. Sometimes the bits are spaced close together in time, and at other times they are separated widely in time.

Each bit of the stream is received concurrently with a timing pulse which is applied from an input data timer 21 by way of a lead 22 to the input write selector 20. Since the data bits are received irregularly, the timing pulses also are received irregularly.

The input write selector 20 includes an arrangement of gates, which directs the stream of input data signals and the accompanying timing pulses alternatively to a first selected one of three input shift registers 25, 26, and 27. The selector 20 includes a number of rotational positions equal to the number of input shift registers. For illustrative purposes, each of the shift registers 25, 26, and 27 is considered to be a tandem combination of commercially available static semiconductor stages having provisions for shifting bits through the stages in response to drive signals. Each of the registers illustratively includes 64 stages and is driven in turn by the timing pulses for writing in the input data stream.

After filling the shift register 25 with a first block of information, the input write selector 20 applies a second block of 64 bits of the sequence of input data to the shift register 26, filling that register. Then the input write selector operates again so that the third block of 64 bits of the sequence is applied to the shift register 27, thereby filling it. The fourth block of 64 bits of the sequence is directed to the shift register 25, which will have been emptied while the shift registers 26 and 27 are being filled.

Because the selector 20 applies input signals alternatively to the three shift registers, it is necessary to determine and control which one of the three shift registers receives input signals at any time.

For purposes of illustration, this determination can be made by a three-stage ring-counter circuit included within the selector 20. Signals produced by the stages of such ring-counter are applied to the selection circuitry for enabling the data signal path and the timing pulse path to a first selected one of the shaft registers, such as the shift register 26, while disabling similar paths to the other two shift registers 25 and 27.

The output of the input write selector 20 is shown as a two-lead swinger for the purpose of illustrating that the input data signals and the timing pulses are carried over separate paths to the shift register 26. The selected path to shift register 26 is represented in FIG. 1 by a dotted line segment 28 which indicates that the selector 20 has selected the shift register 26 to receive data and timing pulses after having filled the shift register 25 with data. Received data pulses are applied to the input IN and the timing pulses are applied to the input DR of the shift register.

When applied to the selected shift register 26, the timing pulses drive the stages of the shift register in lieu of periodic clock pulses. No matter how irregularly the data bits arrive each new bit of data is stored in the shift register by its own timing pulse which also shifts each previously stored bit one stage along the register. The received stream of data signals continues to be stored in and shifted along the register 26 until that register is filled with 64 bits.

As previously indicated, the input write selector 20 directs the input information sequence to different ones of the shift registers in blocks of 64 bits. Because the 64 bits of each block are received at irregular times over an indeterminate period of time, it is convenient to count the input bits for determining when the selected shift register is filled by the block of data. Therefore, an input write counter 29 is provided for counting the number of bits written into each one of the shift registers in turn. The counter 29 can be any conventional feed-forward counter that has sufficient operating speed. One useful counter arrangement is disclosed in FIG. 18–10 of *Pulse, Digital, and Switching Waveforms* by Millman and Taub, McGraw-Hill, 1965.

While the block of 64 bits of the received data sequence is being written into shift register 26, the accompanying 64 timing pulses are applied by way of lead 23 to the input of the write counter 29. The counter counts those bits until it reaches its full-count of 64 and then provides a full-count output signal over lead 30 for incrementing the position of the ring-counter in the input write selector 20.

Concurrently when the 64th bit is stored in the shift register 26, the input write counter 29 reaches full-count and increments the ring-counter. In its new position, the ring-counter applies control signals to the input write selector 20 for directing the next block of 64 bits to the shift register 27 where that block is to be written. The selector 20 directs both the data stream and its accompanying timing pulses to the shift register 27.

The foregoing discussion completes the description of how blocks of data are written into the shift registers. Therefore we shall turn our attention toward reading blocks of data out of the shift registers and transferring those blocks to delay lines.

Information cannot be read out of any one of the shift registers while data is being written into that same register. Since it has been assumed that information is being written into the first selected shift register 26, information cannot be read out of that register; but the information already stored in either one of the other shift registers can be read out for transfer. Therefore a second selected one of the input shift registers now is selected by an input read selector 37 for transferring its stored information to the delay lines.

Since the register 25 previously has been filled to capacity, the block of 64 bits stored therein will be transferred from that shift register to storage in one of the plurality of recirculating delay line modules 14. For exemplary purposes it is considered that there are four delay line modules 31, 32, 33, and 34. In the drawing each of the modules is separated from the others by broken line segments indicated on the drawing. Each of the modules is arranged to store 1024 recirculating bits of data. The delay lines may be of any well known type of delay line, such as the ultrasonic delay line described in the aforementioned *Digest of the ISSCC* (1968). In the instant arrangement, however, the delay line is considered to be operated at approximately 50 MHz.

In FIG. 2 a local clock generator 35 continuously produces clock pulses at the 50 MHz rate. Those clock pulses are applied by way of a master clock lead 36 to each of the delay line modules in a multiple arrangement. The 64 bit block of bits stored in the second selected shift register 25 is to be transferred into a first selected one of the delay line modules, such as the module 32. Because the delay line module 32 operates at the 50 MHz rate and because no input data timing pulses are being applied to the shift register 25, it is necessary to provide additional control circuitry for accomplishing the transfer.

The information stored in the register 25 is transferred efficiently and is written into the delay line module 32 under control of a write control circuit 40. Such circuit 40 produces a block of 64 input read-drive pulses which are applied through a lead 41 directly to an input read counter 41 and by way of the input read selector 37 to the shift register 25. This block of input read-drive pulses is derived in the circuitry 40 by gating a 64 pulse group selected from a continuous stream of pulses, generated at a rate of approximately 2 MHz by an input data transfer control circuit 46.

Figure 5:
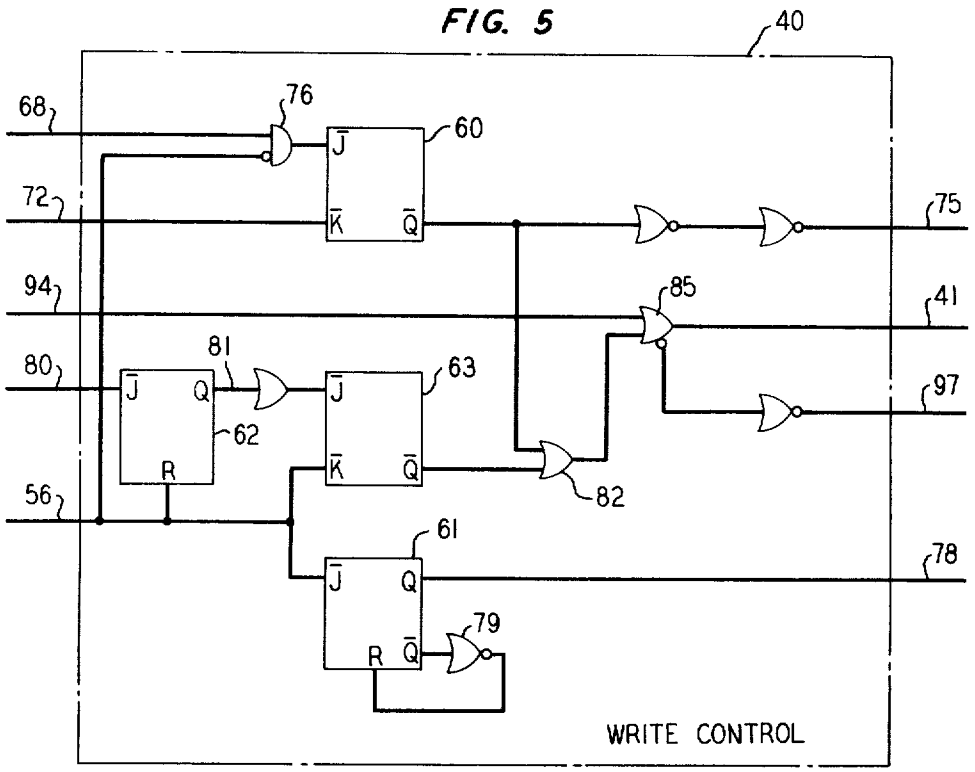
FIG. 5 is a logic schematic of a write control circuit.

Details of the write control circuit 40 are shown in FIG. 5. Operation of the circuit 40 will be described hereinafter in detail with respect to FIG. 5. In the meantime it is important for the reader to understand that circuit 40 is arranged to interrupt the continuous stream of pulses generated by the transfer control circuit 46. The continuous stream of pulses from the transfer control circuit 46 is interrupted when either of the following conditions occur. The first condition is that no shift register is filled with data ready for transfer. The second condition occurs while data is ready in a shift register; but data, previously stored in the delay line module selected to receive the data, is positioned such that the block of data to be transferred cannot be stored in its correct position in the delay line.

Input data transfer control circuit 46 is a frequency converter that produces the stream of pulses at the 2 MHz rate. Broadly speaking, the circuit 46 is a DELTIC interval counter having a full count equal to the integer representing a DELTIC interval between storage positions in the delay line wherein adjacent bits of the input data stream are to be stored. A resettable counter having a full count of 25 has been used as the transfer control circuit 46 in a working model of the invention having a DELTIC interval of 25. This counter is incremented in response to the pulses in the stream of local clock pulses at the 50 MHz rate, produced by the local clock generator 35 and applied to the input of the transfer control circuit 46 by way of the master clock lead 36. The counter divides the 50 MHz rate by 25 producing at its output lead 94 the stream of pulses at the 2 MHz rate.

Transfer of the information from the shift regisiter 25 to the delay line module 32 occurs as a serial block transfer in response to the 64 pulse group of input read-drive pulses at the 2 MHz rate. These pulses are applied through the input read selector 37 and by way of illustrative swinger contacts, representing the selected path indicated by a dotted line segment 48 in FIG. 1, to the shift register 25.

The input read selector 37 includes an arrangement of gates, which directs the block of read-drive pulses to the second selected shift register 25 and provides a path for transmitting the block of retrieved data pulses from the register 25 to a selected delay line. The selector 37 includes a number of rotational positions equal to the number of input shift registers.

Two ganged-swinger contacts are shown for indicating the selected path 48. The upper swinger contact applies the 64 input read-drive pulses through a lead 47 to the drive input DR of the shift register 25, and the lower swinger contact connects with the output terminal OUT of the same shift register for transferring the data stream from the shift register by way of the selector 37 and a lead 50 to the input terminals of the delay line modules.

Input read-drive pulses are applied to only one shift register at a time and are blocked by the selector 37 from being applied to either of the other two shift registers. The particular shift register to which the input read drive pulses are applied is selected by a three-stage ring-counter included within the input read selector 37. Signals produced by the ring-counter are applied to the selection circuitry for determining which one of the input shift registers is connected to the read selector 37 by the illustrative swinger contacts.

The position of the ring-counter in the selector 37 is controlled by the input read counter 42 which is similar to the input write counter 29 described previously. The read counter 42 is incremented by the pulses of the block of input read-drive pulses produced by the write control circuit 40. Upon reaching its full count of 64, the input read counter 42 generates a full-count output signal which is applied over a lead 49 to the input read selector 37 for incrementing the ring-counter one position. Thus the ring-counter and the illustrative swinger contacts are incremented at the end of a block transfer. The swinger contacts then interconnect with another one of the shift registers.

In FIG. 1 an input comparator 52 continuously receives by way of leads 53 and 54 signals representing the rotational positions of the swingers of the input write and read selectors 20 and 37. These signals are produuced by the ring-counters included within the selectors 20 and 37. The input comparator 52 compares the rotational positions of the ring-counters and generates either match or mismatch output signals. The match signal indicates that both swingers are positioned to connect with the same shift register. The mismatch signal indicates that the swingers are positioned to connect with different shift registers.

The output signals from the comparator 42 are applied through a lead 56 to the write control circuit 40 for enabling input read-drive pulses to be applied to the input read selector 37. These drive pulses cannot be applied to the selector at any time when the match signal occurs indicating that the swingers are positioned to connect with the same shift register. When the selector positions thus match, the match signal on lead 56 disables the write control circuit 40 from applying read-drive pulses to any of the shift registers 25, 26, and 27. At other times, the mismatch signal on lead 56 enables the write control circuit 40 to produce read-drive pulses.

Referring now to FIG. 5, there is shown the detailed logic schematic of the write control circuit 40. The schematic is drawn so that all input leads are shown at the left and all output leads are shown at the right, regardless of where those leads are shown in FIG. 1.

Write control circuit 40 is a sequential logic circuit for controlling the transfer of information from the shift registers to the delay lines and for making certain that transferred data is stored in an appropriate location in the selected delay line. Control circuit 40 includes four flip-flops 60, 61, 62, and 63 together with a number of logic gates.

The circuit 40 performs three specific functions. A pulse is generated for resetting the input data transfer control circuit 46 to its full-count state when any delay line is filled. Another pulse is generated for setting a last bit marker 58 to its full-count state when a block transfer is completed and the comparator is producing a match signal. The sequence of 64 input read-drive pulses is produced when the block of information is being transferred from any shift register to any delay line module.

In the control circuit 40, the flip-flop 60 is responsive to signals received over the lead 56 from the comparator 52, to signals received over a lead 68 from a delay line synchronizer 70 of FIG. 2, and to signals received over a lead 72 from a delay line full counter 74 of FIG. 1. In response to those signals, circuit 40 produces on lead 75 a signal for resetting the input data transfer control circuit 46 of FIG. 1. Flip-flop 60 is a standard J–K flip-flop arranged to operate in response to input signal transitions rather than being operated in a synchronous mode by clock pulses. One type of suitable flip-flop includes emitter-coupled logic (ECL) circuits. Signals received over the leads 56 and 68 are combined in a gate 76 and are applied to the input $\overline{J}$. Signals received over the lead 72 are applied to the input $\overline{K}$. All other inputs are held at "0" level.

Normally, the flip-flop 60 is confined to a state wherein its output $\overline{Q}$ is a 0. That state is established when the comparator produces a mismatch signal and the delay line synchronizer 70 produces a "1" output signal for one time slot each time the stored data completes a revolution through the delay lines. At this time the gate 76 applies a 1 to the input $\overline{J}$.

The 1 on input $\overline{J}$ puts the flip-flop into the state wherein $\overline{Q}$ equals 0. This indicates that a block of data is waiting to be transferred and the desired time slot of the next selected delay line is in position to be filled.

As long as the input $\overline{K}$ is held at 0, the input $\overline{J}$ is a "don't care" and the output $\overline{Q}$ stays at 0. That state is held constant until the newly selected delay line is filled and the delay line full counter 74 produces a full-count signal. This puts a 1 on the input $\overline{K}$ of the flip-flop 60 for one 50 MHz clock period. The 1 on the input $\overline{K}$ puts a 1 on the output $\overline{Q}$ and inhibits gates 82 and 85. The inhibited gate 85 disables read clock pulses from being applied through the lead 41 to a shift register for transferring stored data to a delay line. Note that the 1 on the inpút $\overline{K}$ will toggle the flip-flop 60 irrespective of whether a 0 or a 1 is applied to the input $\overline{J}$. At the end of the 50 MHz period, the signal on the lead 72 returns to 0 because shift pulses applied to the input read counter 42 increment that counter and the delay line full counter 74 out of their full count states.

When the delay line full counter applies a full count signal by way of the lead 72 to change the state of the flip-flop 60, the transition of the output signal at $\overline{Q}$ from 0 to 1 resets the information transfer control circuit 46 to its full count state as previously described.

In response to a match signal received over the lead 56 from the comparator 52 of FIG. 1, the flip-flop 61 of FIG. 5 produces a signal for resetting the last bit marker 58. Flip-flop 61 is a standard J–K flip-flop, which is an ECL type circuit, wherein the lead 56 is connected to apply the signal from the comparator to the input $\overline{J}$. All other inputs are held at 0 except for an input R. Normally, the signals on both inputs $\overline{J}$ and R are 0, and the flip-flop 61 stays in a state wherein its output Q is 0. The state of flip-flop 61 is complemented when a match signal from the comparator is applied over the lead 56 to the input $\overline{J}$. The change of state of flip-flop 61 causes a 0 to 1 transition at the output Q. This transition is applied by way of lead 78 to the last bit marker 58 of FIG. 1. In response thereto, the last bit marker is reset to its full-count state. The last bit marker thus is reset to its full-count state once each time a match signal is initiated by the comparator 52.

Signals from output $\overline{Q}$ of the flip-flop 61 are fed back through a NOR gate 79 to the input R. NOR gate 79 is arranged to reset the flip-flop 61 immediately after the flip-flop is complemented. The NOR gate responds to a 1 to 0 transition occurring at output $\overline{Q}$ when the last bit marker 58 is set and applies a reset signal to the input R of flip-flop 61 returning the output Q to 0. Propagation delay of the gate 79 must be greater than the time required to set the last bit marker 58.

In FIG. 1, the last bit marker 58 is a conventional resettable feed-forward binary counter used for producing last bit marker pulses with a minimum of propagation delay. The total propagation delay in the counter is much less than the selected DELTIC interval. Marker 58 includes a number of stages so that its full-count equals the number of storage positions (1,024) in each of the recirculating delay lines. Local clock pulses at the 50 MHz rate are applied by way of the master clock lead 36 to the input of the last bit marker 58 at all times. Because it is set to full-count when a match signal occurs at the end of a block transfer, the marker 58 commences counting at that time. At the 50 MHz clock pulse rate, the marker reaches its full-count of 1,024 concurrently with the completion of each complete recirculation of data through the delay lines.

Each time the last bit marker reaches its full count, it produces from its output a last bit marker pulse which is applied by way of a lead 80 to the write control circuit 40. Such marker pulse occurs when the last bit stored in the selected delay line module 32 passes the input of that delay line.

In FIG. 5, the flip-flops 62 and 63 are responsive to signals, received respectively over the lead 80 from the last bit marker and over the lead 56 from the comparator 52, for controlling application of read-drive pulses by way of the lead 41 to the input read selector 37 and to the input read counter 42 in FIG. 1. These read-drive pulses also are applied by way of the lead 41, through the selector 37, and paths 48 and 49 to the selected shift register 25. In FIG. 5, the flip-flops 62 and 63 are standard J-K flip-flops having input signals applied to their $\overline{J}$, R and $\overline{J}$, $\overline{K}$ terminals similar respectively to the flip-flops 61 and 60. Output signals from the flip-flop 62 are produced at its terminal Q. Output signals from the flip-flop 63 are produced at its terminal $\overline{Q}$. Both of the flip-flops 62 and 63 are derived from ECL type circuits.

The flip-flops 62 and 63 operate in cooperation to control application of the read-drive pulses to the mentioned circuits. Normally, flip-flops 62 and 63 are held in states wherein they produce a 1 and a 0 at their output terminals Q and $\overline{Q}$, respectively.

Flip-flop 62 is set into its state because 0 is applied normally to its input terminal R, and any 1 concurrently applied to its input terminal $\overline{J}$ sets the flip-flop to produce 1 at the output terminal Q. The input signal applied to terminal R by way of lead 56 is 0 at all times when the input read and write selectors are selecting different ones of the shift registers, such as registers 26 and 25 of FIG. 1. Terminal $\overline{J}$ of flip-flop 62 receives a 1 pulse when the last bit marker 58 of FIG. 1 reaches full count once during every 1,024 clock pulses at the 50 MHz rate from the clock generator 35.

Flip-flop 63 is set into the $\overline{Q}$ equals 0 state at the same time that flip-flop 62 is set to produce a 1 at its terminal Q.

When the shift register 25 of FIG. 1 is emptied and the input read selector 37 switches position to connect with shift register 26, both the input read and write selectors are connected to the same shift register 26. Then the comparator 52 produces a match signal, a 1, to indicate that no more data is available for transfer to the delay line modules. The match signal is applied by way of lead 56 to the R and $\overline{K}$ terminals of the flip-flops 62 and 63, respectively.

Simultaneously the output from terminal Q of flip-flop 62 and the input to terminal $\overline{J}$ of flip-flop 63 changes to 0. This change at terminal $\overline{J}$ of flip-flop 63 has no effect on the state of the output $\overline{Q}$ of that flip-flop.

After the flip-flop 62 is reset, the match signal is maintained on its input terminal R until data just fills the shift register 26 and the input write selector switches position to connect with shift register 27. The match signal holds the flip-flop 62 in the reset state until such time.

When the shift register 26 is filled with data, the position of the input write selector 20 of FIG. 1 is incremented, and the comparator 52 reverts to applying a 0 over the lead 56 to the flip-flops 62 and 63. This change of output from the comparator 52 indicates that data once again is waiting to be transferred to a delay line module.

From then until the next subsequent match signal occurs, the flip-flop 62 responds only to last bit signals applied to the input terminal $\overline{J}$. Such signal remains at 0 until a last bit is circulated past the input of the delay line 32. Then, the last bit signal, a 1 is applied to the input terminal $\overline{J}$ of the flip-flop 62 for setting that flip-flop to produce a 1 at its output Q.

The first of any series of last bit signals concurs with the leading edge of a match signal on the lead 56. There is a delay of 1,024 time slots at the 50 MHz rate between any two adjacent last bit signals of any series. Therefore, a 0 is applied to the input terminal $\overline{J}$ of the flip-flop 62 most of the time.

After the flip-flop 63 is complemented to produce a 0 from its output terminal $\overline{Q}$, the flip-flop 63 remains in that state until a match signal is applied from the comparator 52. At that time the state of flip-flop 63 changes so that a 1 is produced at terminal $\overline{Q}$. While the flip-flop 63 produces a 1 at terminal $\overline{Q}$, it blocks read-drive pulses from being produced on lead 41.

Gate 82 is an OR gate which operates in response to the output signals from the outputs $\overline{Q}$ of the flip-flops 60 and 63. A 0 output from gate 82 is a read-drive pulse enabling signal, This 0 is produced in response to concurrent 0 signals produced from the outputs $\overline{Q}$ of the flip flops 60 and 63. Three conditions must be met. Information must be ready for transfer, the last bit marker must have changed the state of flip-flops 62 and 63, and there must be room in the selected delay line for storing the data.

In any other conditions, the gate 82 will produce a read-drive pulse disabling signal which is a 1.

Gate 85 is another OR gate which operates in response to the output from gate 82 and a 2 MHz pulse stream applied by way of lead 94 from the input data transfer control circuit 46. Groups of 64 read-drive pulses are produced by the gate 85 in response to those inputs.

After the gate 85 has been disabled, the first pulse of the next subsequent group of 64 read-drive pulses is produced in response to either of the following two conditions.

If the delay line is partially filled at the time, the output $\overline{Q}$ of the flip-flop 60 is a 0. Then the first read-drive pulse is produced in response to the occurrence of a last bit marker pulse on lead 80. This marker pulse indicates that the selected delay line is in a correct position to receive the first bit of the block of data to be transferred.

If the delay line is filled when the read-drive pulse stream is to be produced, the first read-drive pulse of the group occurs in response to the full-count pulse received by way of lead 68 from the delay line synchronizer 70. This full-count pulse indicates that the delay line has been filled.

Upon occurrence of the 64 read-drive pulse in the group, a decision is made whether to transmit another group of 64 pulses or block them for a while. A new block of read-drive pulses is transmitted if there is room available in the delay line and information is waiting to be transferred from one of the shift registers. The read-drive pulses are blocked if a delay line is just filled or if no shift register is full and waiting to transfer information to a delay line.

Referring once again to FIG. 1, the delay line full counter 74 is a conventional feed-forward binary counter. It is arranged to count the number of blocks of information that have been transferred from the shift registers 25, 26, and 27 into the selected delay line module. By way of a lead 91 from the output of the input read counter 42, this counter 74 receives and is incremented by full-count pulses from the counter 42. The delay line full counter 74 includes four stages and produces delay line full output pulses which are applied to two different blocks of the input circuitry. Through a lead 92 they are applied to a delay line write selector 93. Additionally, via lead 72, they are applied to the write control circuit 40.

The delay line write selector 93 is a circuit arranged for controlling write-in to the delay line modules. At any time, only one module is enabled for write-in and all others are disabled. The selector 93 includes a conventional ring-counter having a number of stages equal to the number of delay line modules. Each stage of the counter is associated with one of the delay line modules and is arranged to apply enabling and disabling signals to the module for controlling input to that module. To assure that only one module is enabled at a time, the ring-counter has one stage in a complementary state from the state of all the other stages. The stage having the complementary state is incremented sequentially in response to the delay line full signals applied by the delay line full counter 74 after every 1,024th bit is stored in a delay line. As this complementary state circulates through the stages of the selector 93, different ones of the delay line modules are enabled to receive data. The signals from the selector 93 are applied by way of multiple conductors 95 to a delay line write access circuit 96. By thus incrementing the complementary state of the ring-counter, a new delay line is selected for receiving the next 1,024 bits of transferred data.

The output of the delay line full counter 74 also is applied to the write control circuit 40 for disabling operation of the input data transfer control circuit 46 and for setting that circuit to its full-count state, as previously described. In response to a full-count pulse, the flip-flop 60 in the control circuit 40 is complemented to produce on terminal $\overline{Q}$ a 1 output, as previously described.

The delay line synchronizer 70 shown in FIG. 2 is a 1024 bit conventional feed-forward binary counter. It is incremented by pulses from the local clock generator 35 which applies those pulses to the synchronizer 70 at the rate of 50 MHz. The delay line synchronizer produces an output pulse 1 for every 1,024th pulse of the local clock generator.

These output pulses from the delay line snychronizer are applied by way of the lead 68 to the write control circuit 40. The first one of the pulses sets the flip-flop 60 in FIG. 5, as previously described. By thus setting the flip-flop 60 to produce a "0" at the output $\overline{Q}$, the write control circuit 40 enables the input data transfer control circuit 46 to commence counting from its full-count state. The control circuit 46 then counts at the 50 MHz local clock generator rate, as previously described.

The output pulse from the delay line synchronizer 70 also is applied by way of the lead 69 and the flip-flop 60 to gate 82 for enabling the gate 85 to transmit 64 of the 2 MHz pulses, produced by the input data transfer control circuit 46, to the shift registers 25, 26, and 27; to the input read selector 37; to the input read counter 42 via lead 41 shown in FIGS. 1 and 5; and to the delay line write access circuit 96 via lead 97 shown in FIGS. 1, 2, and 5. By thus enabling the gate 85 in response to the output from the delay line synchronizer, it is assured that the first bit of the first block of information pulses stored in the selected delay line is aligned with the first bit stored in any other delay line.

The delay line write access circuit 96 is a circuit for controlling application of clock pulses at the 50 MHz rate to a selected one of the delay line modules for enabling that module to receive and store a block of data being transferred from the shift register which is being read out. All other delay line modules are disabled from receiving data at that time.

In FIG. 2 the access circuit 96 continuously receives 50 MHz pulses by way of the lead 36 from the local clock generator 35 of FIG. 2. The circuit 96 also receives a block of sixty-four 2 MHz pulses by way of the lead 97 from the write control circuit 40. The mentioned leads 36 and 97 appear as input leads to the circuit 96 in FIG. 6.

Figure 6:
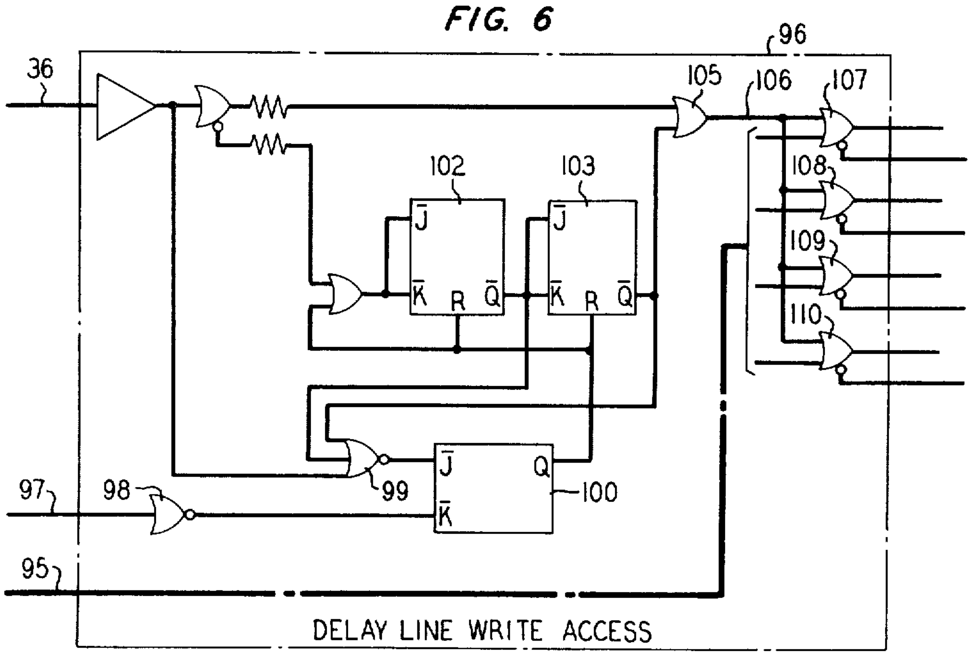
FIG. 6 is a logic schematic of a delay line write access circuit.

In FIG. 6, the delay line access circuit is arranged to enable write-in to the selected delay line module 32 for the pulse width of one 50 MHz pulse during the pulse interval of each of the 64 read-drive pulses at the 2 MHz rate. An initializing flip-flop 100 and a 2-bit counter including flip-flops 102 and 103 are arranged to control generation of a single 50 MHz pulse at a suitable time during the occurrence of each of the 2 MHz read-drive pulses.

Initially, the flip-flop 100 receives signals on each of its inputs $\overline{J}$ and $\overline{K}$ such as to produce a 1 at output Q. This 1 output is applied to the R inputs of the flip-flop 102 and 103 disabling them.

Because of delays which can occur in the input circuitry 11 of FIG. 1, it is possible that the leading edge of the 2 MHz pulse may occur during the period of the 50 MHz pulse. Information, however, should be gated into the delay lines under control of the 50 MHz pulse. Therefore, rather than merely generating a pulse immediately upon occurrence of the initial 2 MHz drive pulse transient, the initializing flip-flop 100 removes a disabling signal from the flip-flops 102 and 103 in response to the initial 2 MHz pulse transient. A 1 to transition on the lead 97 is complemented by gate 98 and applies a 0 to 1 transient on input $\overline{K}$ of the flip-flop 100. The output Q of that flip-flop changes to 0 enabling the flip-flops 102 and 103 to count.

Two subsequent pulses at the 50 MHz rate are required to change the state of the second flip-flop 103 and thereby enable one pulse at the 50 MHz rate to be transmitted through a gate 105. The first two 1 to 0 transitions on the lead 36 cause the flip-flops 102 and 103 to count leaving the $\overline{Q}$ output of the flip-flop 103 at 0. Both inputs to gate 105 therefore are 0. The following 0 to 1 transition on the lead 36 is transmitted through the gate 105. The pulse from the gate 105 is applied by way of a lead 106 in multiple to the inputs of output gates 107, 108, 109, and 110.

Gate 108, which is associated with the selected delay line module 32 of FIG. 2, is enabled to transmit the pulse received on line 106 as a double rail, or two phase, signal to the module 32. At the module 32, one phase is applied to a write-enable lead for writing a bit of data into the delay line, and the other phase is applied to an inhibit recirculation lead for disabling recirculation of stored data.

Referring once again to FIG. 6, the next subsequent 1 to 0 transition on the lead 36 increments the flip-flop 102 to produce a 0 at its output $\overline{Q}$.

At that time the $\overline{Q}$ outputs of the flip-flops 102 and 103 and the input on lead 36 are all at 0. Therefore, all three inputs to NOR gate 99 are at 0, and its output changes to a 1. This 0 to 1 transition is applied to the input $\overline{J}$ of the flip-flop 100 which is toggled. Output Q of the flip-flop 100 changes to a 1 that resets the flip-flops 102 and 103. The flip-flop 103 then produces a 1 at output $\overline{Q}$ and inhibits the gate 105.

As soon as the states of the flip-flops 102 and 103 are thus changed, the NOR gate 99 responds to the resulting input combination by producing a 0 output. This is applied to the input $\overline{J}$ of the flip-flop 100, which now awaits the next 1 to 0 transition on the lead 97.

As previously mentioned, the delay line modules 31, 32, 33, and 34 of FIG. 2 are well known circuit arrangements. Each module includes four inputs and one output.

The inputs are information, write enable, inhibit recirculation, and clock pulses. The clock pulses occur at the 50 MHz rate and are applied through the lead 36 in a multiple arrangement to the clock inputs of each of the modules. Write enable and inhibit recirculation signals from each of the output gates 107, 108, 109 and 110 of FIG. 6 are applied to the associated one of the delay line modules for controlling recirculation of data and write-in of new data. Only one module is inhibited from recirculating data at a time. All others therefore are enabled to recirculate data while the one module has data written in. Pulses representing the block of data being read out of the shift register 25 of FIG. 1 are applied by way of lead 50 in multiple to the write-in inputs of all of the delay line modules 31, 32, 33, and 34.

Figure 7:
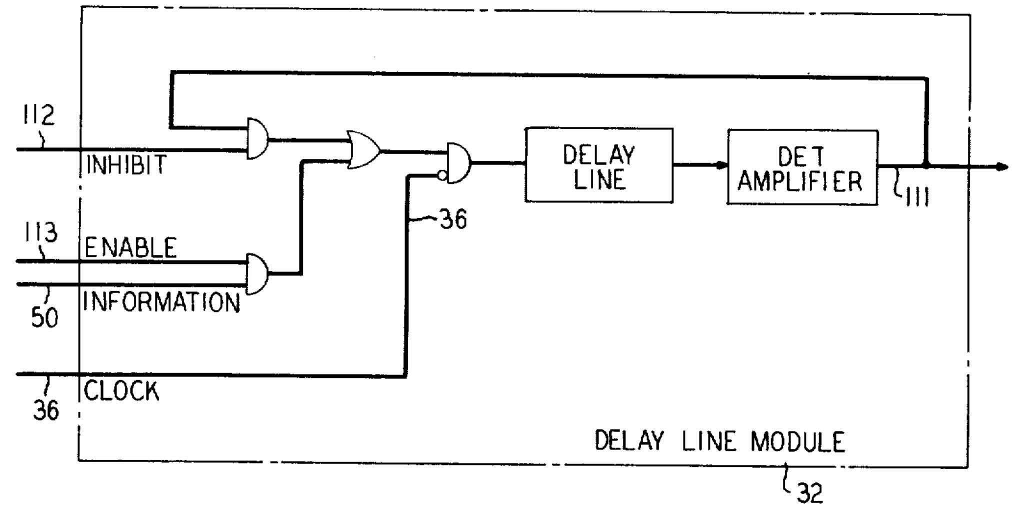
FIG. 7 is a logic schematic of a delay line module.

FIG. 7 shows a logic gating arrangement which has been successfully used in the delay line modules of the subject buffer store. Information and clock signals are applied respectively by way of leads 50 and 36. Output signals are carried over lead 111. Inhibit and enable signals from the gate 108 of FIG. 6 are applied on leads 112 and 113.

The foregoing discussion completes the description of how an asynchronous stream of data is received by the input circuitry 11 and is buffered into storage in the delay line module 32. Once that data is stored in the selected delay line module 32, that data is continuously recirculated therein until an inhibit recirculation signal is applied to the module.

Subsequent blocks of data, from the shift registers 26, 27, and so on are stored in the same delay line module 32 until 16 of such blocks of 64 bits have been interleaved on the DELTIC interval basis.

Once the selected delay line 32 is thus filled to capacity, the delay line full signal, generated on lead 92 by the counter 74, increments the position of the delay line selector 93. The selector 93 thereafter channels the next following and subsequent blocks of data to another selected delay line module, such as the module 33 in FIG. 2.

It is assumed that the delay line module 31 had been filled to capacity before the stream of data first was directed to the module 32. While the data stream is being written into the module 32, the data previously stored in the module 31 is ready for read-out from storage at any time the output circuitry 12 of FIG. 3 signals commencement of the read-out operation.

Read-out signals from all of the delay line modules are transmitted by way of separate leads 111 to a delay line read access circuit 114 for transfer of the stored data from the delay line modules to the output data receiver 15 in FIG. 3, as described hereinater.

Figure 8:
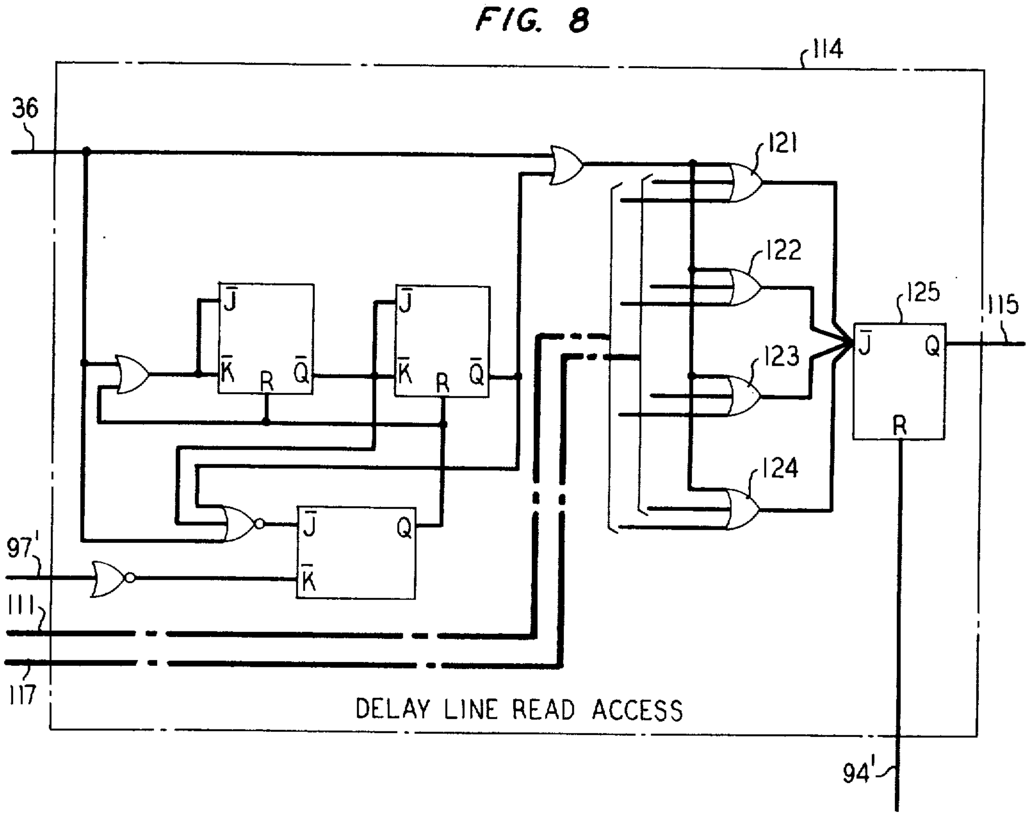
FIG. 8 is a logic schematic of a delay line read access circuit.

The delay line read access circuit 114 is shown in greater detail in FIG. 8. The circuit 114 simultaneously receives output signals from all of the delay line modules 31, 32, 33, and 34 by way of the leads 111. At the same time, an enabling signal is applied through one lead of a group of leads 117 and one of a group of output gates 121, 122, 123, and 124 to the circuit 114.

Clock lead 36 applies the 50 MHz pulse stream to the circuit 114 for operating it similarly to the operation of the delay line write access circuit 96 of FIG. 6. Lead 97′ applies a block of sixty-four 2 MHz pulses from a read control circuit 40′ in FIG. 3.

At any time only one of the output gates 121, 122, 123, and 124 is enabled to transmit data signals through a pulse stretching flip-flop 125 and the lead 115 to an output write selector 37′ in FIG. 3. The pulse stretching flip-flop 125 is arranged to be reset by pulses at the 2 MHz rate applied by way of the lead 94′ from an output data transfer control circuit 46′ of FIG. 3. The selector 37′ operates like the input read selector 37 except that information signals are applied by way of lead 115 and are transmitted out by way of a switching circuit to a selected one of three shift registers 25′, 26′ and 27′. The switching circuit is shown illustratively as a pair of swinger contacts connected to the shift register 26′. The information signals are applied to the shift register 26′ by way of the terminal designated IN.

Except for the following differences, output control circuits 40′, 42′, 46′ 58′ 74′, and 93′ operate similar to their similarly designated unprimed counterparts in the input circuitry 11 of FIG. 1. During readout, the first bit marker 58′ keeps track of where in the delay line module is the next bit to be read out rather than where the last bit was stored. The comparator 52′ compares the position of the output write selector 37′ with the position of an output read selector 20′ and prevents reading out of any one of the output shift registers 25′, 26′ and 27′ while information is being written into the same register. Thus a pair of swinger contacts associated with the output read selector 20′ is shown connected with the output shift register 25′ while the output write selector 37′ is shown connected with the output shift register 26′. The delay line synchronizer 70 insures via read control circuitry 40′ that the first bit read out from a delay line is, of the remaining bits, the first bit written into that same delay line.

In this arrangement, information signals, read out of, for example, delay line 31, are transmitted through one of the leads 111, the delay line read access circuit 114, and the lead 115 to the output write selector 37′. Those signals are transmitted through the selector 37′ and are written into the output shift register 26′. Once the register 26′ is filled and the output read selector 20′ thereafter is connected to the shift register 26′, the information signals can be read out through the output read selector 20′ to the output data receiver 15.

Timing pulses for operating the output shift registers are derived from two sources. Write timing pulses are generated by the read control circuit 40′ on the lead 41′. Those pulses are transmitted through the output write selector 37′ and the associated swinger contact to the selected shift register terminal designated DR. Readout timing pulses are generated by an output data enable circuit 127 and are transmitted through the output read selector 20′ and its associated swinger contacts to the selected shift register terminal designated DR.

The foregoing discussion describes how information stored in delay line module 31 is read out and is transmitted in sequential order to the output data receiver 15. Information stored in other delay line modules is read out similarly upon receipt of a subsequent request from the output data enable circuit 127.

The illustrative buffer store includes three shift registers in the input and output circuits. The number of shift registers in the input and output circuits need not be restricted to three and can be any integral number greater than one. If two shift registers are used in the input and output cicuits, the number of stages N of each shift register must be greater than $$\frac{T_A}{\left(\frac{1}{f_I} - \frac{1}{f_T}\right)}$$

where $T_A$ is the maximum access time to a particular time slot of the delay line, $f_I$ is the maximum input data frequency and $f_T$ is the transfer frequency of data written into the delay line.

By using three or more shift registers, the total number of shift stages $N_{SR}$ is reduced at a cost of only slightly increased circuit complexity. The saving of shift register stages is very great in particular situations when the value of $f_T$ is very close to the value of $f_I$.

If $f_I$ approaches $f_T$, the total number of shift register stages $N_{SR}$ approaches infinity; and therefore, for practical purposes, three or more shift registers must be used in the input circuit. A similar relationship holds for the output when $f_O$ approaches $f_T$.

When three shift registers are used in rotation in the input circuit, each of the shift registers must have the same number of stages N. If the transfer frequency $f_T$ of data written into the delay line is greater than or equal to the maximum input of data frequency $f_I$, the total number of stages $N_{SR}$ must be equal to or greater than the number of bits arriving during the access time $T_A$.

$$N_{SR} \geq T_A f_I.$$

Similarly, for readout $$N_{SR} \geq T_A f_O$$

where $f_O$ equals the maximum output data rate.

The number of shift registers used in the input circuit does not have to be equal to the number of shift registers used in the output circuit whenever $f_I$ is not equal to $f_O$.

The above detailed description is illustrative of an embodiment of the invention, and it is to be understood that additional embodiments thereof will be obvious to those skilled in the art. The embodiment described herein, together with those additional embodiments, are considered to be within the scope of the invention.

What is claimed is:

1. A buffer store comprising a plurality of synchronous memory modules, means including a set of three input shift registers for selectively receiving an asynchronous stream of data signals and time buffering the stream of data signals, means for synchronously transferring the buffered stream of data signals from the input shift registers into storage in the memory modules on an interleaved time compression basis, means including a set of three output shift registers for selectively retrieving the stored stream of data signals in sequential order from the memory modules, and means responsive to asynchronous demand signals for time buffering the retrieved stream of data signals from the output shift registers and forwarding the retrieved stream of data.

2. A buffer store comprising means for receiving an asynchronous stream of input data signals, a plurality of input shift registers, each having *n* stages, means for selecting from the plurality in sequential order a first input shift register and directing a block of *n* bits of the stream of input data signals into the first selected input shift register, a plurality of recirculating ultrasonic delay lines, means for selecting from the delay line plurality in sequential order a first delay line and controlling entry of data signals into the first selected delay line, and means operating concurrently with the selecting and directing means and responsive to the controlling means for selecting from the plurality of input shift registers in sequential order a second input shift register and synchronously transferring another block of *n* bits of data signals from the second selected input shift register into the first selected delay line and interleaving bits of the stream of data between other bits of the stream therein.

3. A buffer store in accordance with claim 2 wherein the selecting and directing means comprise an input write selector having a number of rotational positions equal to the number of input shift registers and each rotational position being associated with a different one of the input shift registers, the store further comprising means for receiving an input information timing pulse concurrently with each received data signal, means for applying received data signals to the input write selector, an input write counter having a full count equal to the number of stages in each of the shift registers and producing a full count signal for controlling the rotational position of the input write selector, means for applying input information timing pulses to the input write selector and to the input write counter, the input write selector being stepped one rotational position to a new position in response to each full count signal, and the input write selector being arranged for applying the received data signals and the input information timing pulses to the first selected one of the shift registers which is associated with said new position of the selector.

4. A buffer store in accordance with claim 3 wherein the selecting and transferring means comprise an input read selector having a number of rotational positions equal to the number of input shift registers and each rotational position being associated with a different one of the input shift registers, the store further comprising means for producing input read-drive pulses, an input read counter having a full count equal to the number of stages in each of the shift registers and producing a full count signal for controlling the rotational position of the input read selector, means for applying the input read-drive pulses to the input read selector and to the input read counter, the input read selector being stepped one rotational position to a new position in response to each full count signal from the input read counter, the input read selector being arranged for applying the input read-drive pulses to a second selected one of the shift registers which is associated with said new position of the input read selector, and the input read selector being further arranged for transferring data signals from the second selected one of the shift registers to the first selected delay line.

5. A buffer store in accordance with claim 4 further comprising means responsive to the positions of the input write selector and the input read selector for producing a match signal at any time the input write selector and the input read selector are positioned to connect with the same input shift register, and means responsive to the match signal for disabling the input read-drive pulse producing means.

6. A buffer store in accordance with claim 2 wherein the bits are interleaved in the selected delay line by storing adjacent bits of the input data stream in storage positions separated by an integral number of storage positions, the number having the integer 1 as the only common denominator with the total number of storage positions in the delay line.

7. A buffer store in accordance with claim 6 wherein the plurality of shift registers is limited to three.

8. A store comprising a plurality of recirculating ultrasonic delay line modules for storing a stream of data on an interleaved basis, a plurality of shift registers, means for selecting and controlling retrieval of the data stream from a selected one of the delay line modules, means responsive to the selecting and controlling means for selecting a shift register and synchronously transferring the data stream in sequential order from the selected one of the delay line modules to the selected one of the shift registers, and means for asynchronously retrieving the stream of data from the selected shift register.

* * * * *